(12) United States Patent
Cascio et al.

(10) Patent No.: US 8,144,963 B2
(45) Date of Patent: Mar. 27, 2012

(54) METHOD FOR PROCESSING BIOMEDICAL IMAGES

(75) Inventors: Donato Cascio, Castelbuono (IT); Francesco Fauci, Palermo (IT); Rosario Magro, Sciacca (IT); Giuseppe Raso, Sciacca (IT)

(73) Assignee: Cyclopuscad S.r.L., Palermo (IT)

( * ) Notice: Subject to any disclaimer, the term of this patent is extended or adjusted under 35 U.S.C. 154(b) by 823 days.

(21) Appl. No.: 12/296,628

(22) PCT Filed: Apr. 10, 2007

(86) PCT No.: PCT/IB2007/051282
§ 371 (c)(1),
(2), (4) Date: Oct. 9, 2008

(87) PCT Pub. No.: WO2007/119204
PCT Pub. Date: Oct. 25, 2007

(65) Prior Publication Data
US 2009/0274349 A1    Nov. 5, 2009

(30) Foreign Application Priority Data
Apr. 13, 2006 (IT) .............................. RM2006A0213

(51) Int. Cl.
*G06K 9/00* (2006.01)
*G06K 9/32* (2006.01)
(52) U.S. Cl. ....................................... 382/131; 382/300

(58) Field of Classification Search .................. 382/128, 382/129, 130, 131, 300
See application file for complete search history.

(56) References Cited

U.S. PATENT DOCUMENTS
5,832,103 A    11/1998  Giger et al.
2006/0182340 A1*  8/2006  Cardenas et al. ............. 382/173

FOREIGN PATENT DOCUMENTS
WO    99/28853    6/1999

OTHER PUBLICATIONS

PCT Search Report for PCT/IB2007/051282 in the name of Medicad s.r.l. filed on Apr. 10, 2007.
PCT Written Opinion for PCT/IB2007/051282 in the name of Medicad s.r.l. filed on Apr. 10, 2007.
Morrow et al. "Region-based contrast enhancement of mammograms", vol. 11, No. 3, Sep. 1, 1992, pp. 394-397.
Kupinski et al. "Automated Seeded Lesion Segmentation on Digital Mammograms", vol. 17, No. 4, Aug. 1998.
Bankman et al. "Segmentation Algorithms for Detecting Microcalcifications in Mammograms", vol. 1, No. 2, Jun. 1997, pp. 141-149.

* cited by examiner

*Primary Examiner* — William C Dowling
*Assistant Examiner* — Ryan Howard
(74) *Attorney, Agent, or Firm* — Steinfl & Bruno LLP

(57) ABSTRACT

The present invention relates to a method for highlight and to diagnose regions of interest in biomedical radiographic images, useful in the context of a CAD tool processing operating as second reader during the normal clinical and screening routine, so reducing the costs of management of the "double reading" procedure.

14 Claims, 10 Drawing Sheets

METHOD FOR PROCESSING BIOMEDICAL IMAGES

CROSS REFERENCE TO RELATED APPLICATIONS

The present application is the US national stage of International Application PCT/IB2007/051282 filed on Apr. 10, 2007 which, in turn, claims priority to Italian Application RM2006A000213, filed on Apr. 13, 2006.

INTRODUCTION

The present invention applies to a processing method of biomedical images for the early detection of tumoral pathologies, which is included in a CAD for diagnostic aid.

The further described invention can be used, for instance, to look for mass lesions in mammographic images, but it can be used also to look for other generic mammary pathologies and tumoral forms.

Moreover, the further described methodology is enough flexible to adapt it too to the analysis of other typical medical diagnostic images: generic radiographies, spiral CT, NMR, ecographies, etc.

From the Greek καρκινοσ (crab), the word carcinoma is owed to Hippocrates and designs the infiltration characteristic of a tumour and its extraordinary ability of aggression towards the surrounding structures.

There exists a somehow widespread opinion that the carcinoma is a modern age disease, a consequence of the industrial civilization growth. The current way of life, the atmospheric pollution, the chemical additives used for food conservation and other factors are surely the main causes of the enormous increase of tumour incidence during the last 50 years: one may state that the tumours became a real social problem.

Every year there are 10 million worldwide recorded cases among which about 4 million are mortal/fatal. In Italy there are about 270,000 new cases per year among which 30,000 lung cancer fatalities, 14,000 bowel cancer fatalities and 10,000 breast cancer fatalities. In the FIGS. 1A and 1B we represent the rates of mortality vs. the age for seven main tumour types, for both men and women in the European Union, between 1955 and 1999. Along to a real increase of the number of cancer incidences, one must still consider the possibility to diagnose a continuously growing number of cancer incidences, due to the diagnostics techniques improvement; actually, nowadays more than 50% of treated patients are likely to recover successfully. Nevertheless, one has to recall that recovery probabilities are strongly conditioned by detection stage of the illness. Values near 100% are obtainable for those tumours that are defined in situ and diagnosed in their pre-clinic phase.

Today, the strategy of fighting tumours still relies on three fundamental pillars on which are focused all clinical attempts in order to improve the results: the prevention, the early diagnosis and the appropriate therapy.

The image diagnostics holds a fundamental role in the early diagnosis of many kinds of tumours (from breast to prostate cancer, as well as from lung cancer to hepatic carcinoma) through mammographic exam, echography, Computerized Tomography, Magnetic Resonance, biopsy and three-dimensional reconstructions.

The pre-clinic diagnosis can be realized with instrumental equipment if the tumour is still in the asymptomatic phase with limited expansion, and it is aimed to acknowledge tumour's presence while it's still small sized.

For this purpose, one performs the early diagnosis through the so-called "screening programs" which consist in applying diagnostic tests to the asymptomatic patients, with the purpose to identify the subjects potentially inclined to develop the disease. The ultimate screening objective is to reduce the specific mortality of the investigated pathology among the population making the object of study, thanks to early diagnosis and to neoplasm treatment in its initial phase.

More specifically, one will describe further an application of this invention within the field of early breast tumour detection in mammographic images.

The breast cancer is one of the main causes of mortality, as well as being the first cause of tumour mortality among the western countries female population. One can reduce this mortality if the pathology is diagnosed before its symptoms show up. For this purpose, during the last decades there have been introduced several screening programs consisting in submitting women aged between 49 and 69 years, to mammographic examination. Thanks to these programs which involved a large amount of money and human resources, the breast cancer mortality has been considerably reduced despite an increase of diseases' incidence. At the beginning, the breast cancer appears as a single and confined lesion (usually called "early" or "minimal" breast cancer) and its dimensions do not exceed one centimeter; the lack of certain symptomatic signals of the disease makes difficult its early diagnosis. The success probabilities of the struggle against the cancer are strongly correlated to the pathology development stage at the moment of its diagnosis.

Mammography is currently considered the most efficient diagnostic tool for the early detection of a cancer. Nevertheless the methodology, although notably improved over the years, cannot ensure recognition of all pathologic breast lesions: more recent statistics report percentages varying between 10% and 30% of tumours not being diagnosed with the mammographic examination. The analysis of mammographic images is not deprived of some difficulties related to the image quality, to the size of the lesions and to the contrast between lesions themselves and the surrounding tissue.

One of the main tumoral shapes visible in mammographies are the mass lesions. The identification of such lesions raises several problems related to intrinsic characteristics of the lesions:

dimensions, forms and density may vary on a high scale range;

very often the boundaries are not well defined;

they show up high likeness to the parenchyma structure.

Furthermore, the mass lesions are often characterized by anomalous shape in the parenchyma structure: in fact, architectures' distortions and the appearance of radiant lines from a central mass are frequent examples among the malignant lesions. These distortions can assume extremely thin shapes and a meaningful part of them can be detected by the radiologists especially during the first phases of development.

The cause of a missed diagnosis can depend on the particular tumoral pathology (intrinsic contrast too low with respect to the surrounding tissue), the low quality of the mammography or the missed radiologist recognition (cause not independent from the first two). The limits of the mammography are particularly obvious in the case of young patients with "dense" breast; for these the presence of fibrous tissues with high radio-opacity makes the tumour radiological signs lowly evident. In these cases and in the "doubtful" ones one will use other alternative techniques, mostly invasive, typically the sampling and the histological analysis of samples of sick tissue. The healthy structures in the breast are the noise with respect to the signal making the object under investigation.

On the other hand, the variety and the complexity of such connective and glandular structures make the extraction of the signal an arduous task for the radiologist. The diagnostic strategy of the radiologist is based on the search for areas with dense nuclei, star like or lobular structures which don't show up in a health tissue.

The percentage of sick persons correctly recognized through mammographic examination by an experienced radiologist lies between 73% and 88%, while the percentage of healthy people correctly recognized lies between 83% and 92%. These values can be improved by 2% up to 10% in the case of a reading independently made by two radiologists, or in "double blind" mode, as usually called in the medical environment.

Because of economic and organizational problems, it can be convenient to replace the second radiologist with an expert system (CAD). The idea dates back at the end of the sixties and today, thanks to the progress achieved in both fields of computational tools and software development, can become a reality of the clinical routine. The goal of the CAD is:
- to improve the mammographic sensitivity, through the increasing of the meaningful potentially suspicious areas detection;
- to improve the specificity in order to decrease the number of False Positives, thus reducing the number of unnecessary biopsies.

For many years the international scientific community has shown a continuously growing interest to the CAD systems development to be used as assistant to medical diagnosis.

The general strategy followed up to develop a CAD includes several phases; at first the regions that contain information useful for the analysis are selected, then the most meaningful characteristics (commonly known as "features") are chosen from these regions, in order to be processed up to produce a valid classification for the original image.

The algorithms able to detect tumoral lesions can be classified in three categories:
1. algorithms that identify in the breast two types of regions, suspicious and normal, extract the features only from the suspicious regions and classify them as positive or negative;
2. algorithms that extract the features on the whole image and use a classifier to detect the pathological regions; such algorithms use families of filters (wavelet transform or other) with the purpose to discriminate the regions from the healthy parenchyma tissue;
3. algorithms that extract suspicious regions by comparison of the right and left breast mammographies, with the purpose to consider small density differences as a symptom of pathology.

Some structural problems put a limit to the potentialities of the two latter families of algorithms. In fact, for the type "2" algorithms, in the case of dense tissue one gets very often a higher number of suspicious regions, with a consequent increase of the false positives per image. Moreover, the number of examples (patterns) needed to train the classifier on entire images must be extremely elevated in order to get effective results. As for the type "3" algorithms, very often the two breasts are not perfectly super-imposable because of their intrinsic differences.

Images segmentation is a key problem in "computer vision". Such action allows the splitting of the image in regions corresponding to objects or parts of objects represented in it, and it acts as a first step towards the extraction of meaningful information. The segmentation is a decomposition of the image in spatially separated components. The pixels in each component exhibit some similarities of their characteristics, as for instance their grey levels. The two main image segmentation techniques are based on the contour or on the region. In the contour based approach, the information is found by the detection of the boundary. On the other hand, the main idea of region segmentation is the identification inside the image of various regions with similar characteristics. The initial segmentation will strongly influence the following phases of the classification process. Therefore such segmentation has to be the most accurate possible, avoiding both the under-segmentation (merging in the same zone of semantically different objects) and the over-segmentation (splitting of a semantically unique object in different zones).

The features related to shape analysis can be helpful for the detection and classification of mass lesions. In specialty literature, a lot of morphological, structural and statistical features are used in order to discriminate the mass lesions from the healthy parenchyma. For the classification step, one uses generally learning artificial neural networks, or other classification systems without learning. Some research groups have developed software allowing to detect the pathological regions using SVM (Support Vector Machine), Bayesian, Decision Tree or other kinds of classifiers.

Some commercial systems make use of tools to improve the visualization of the image and the characteristic details of the mammographic lesions; particularly most of them have a 3 step classification process: at first, the mammographies are digitized, then some "pattern recognition" algorithms are applied in order to detect the abnormal region of the breast, finally the artificial neural networks are used to classify such abnormalities in benign or malignant. For most systems, a scanner with spatial resolution between 45µ and 80µ and 12-bit depth, is used to digitize and to analyze the films.

During the last years the use of the CAD in medical diagnostics has certainly reached a high level of performance. Different studies refer to comparisons between diagnosis formulated by the radiologist without and with the aid of the CAD; generally the results show an increase of the radiologist sensitivity and, in the most favourable cases, the confirmation of diagnosis specificity. Nevertheless some radiologists have noticed that, in the overwhelming part of the cases, the CAD "sees" what the radiologist has already seen. Now, while it is true, also in this case, that the CAD results are certainly helpful in diagnosis, for both cases of double reading and radiologist fatigue, it is also true that for the radiologists the most urging request is the possibility to detect and to diagnose early even the weakest signals of pathology.

The recognition of the so-called "minimal cancer" or "gap carcinomas" represents indeed the most binding challenge for any diagnostic CAD and it constitutes the true added value that computer technology can bring in the early diagnosis of tumours.

From the technical point of view all the searches and all the products based on the CAD, are essentially using technologies that try to mathematically reproduce the natural behaviour of the human eye. In the classification phase, some features are calculated on the image or on parts of it, that synthesize, analytically, different properties of the region of interest (ROI) and discriminate among healthy and sick. In literature, more than 40 different features had been used sometimes, some of which exhibiting good discriminating properties.

Nevertheless, it is to be noticed that in all cases reported in the literature the features are extracted just once for each ROI; that is the features come out by "freezing" the image to the time t0, when the examination was done. This can be considered as the study of the "static" behaviour of the features.

SUMMARY OF THE INVENTION

The present invention is an innovative solution to the problems above underlined with regard to the methodologies of known technique.

The object of this invention is a method for processing biomedical images, as defined into the independent claim 1.

Secondary features of the present invention are defined into the corresponding dependent claims.

The method described in this invention is set as a tool for the early diagnosis of mass lesions in mammography. The invention can be used in the context of a CAD that operates as second reader in the normal clinical routine and in the mammographic screening, reducing the costs of management for the "double reading" procedure.

The invention proposes oneself to underline and to diagnose some regions of interest (ROI) in generic images diagnostics.

The invention will be described in the following and, as an example, will be applied to look for mass lesions in mammographic images, but it can be used also to look for other generic mammary pathologies and generic tumoral pathologies.

BRIEF FIGURES DESCRIPTION

The advantages, as well as the features and the operation modes of the present invention, will be made apparent in the following detailed description of preferred embodiments thereof, given by way of example and not for limitative purposes, making reference to the figures of the annexed drawings, wherein.

Figure 5:
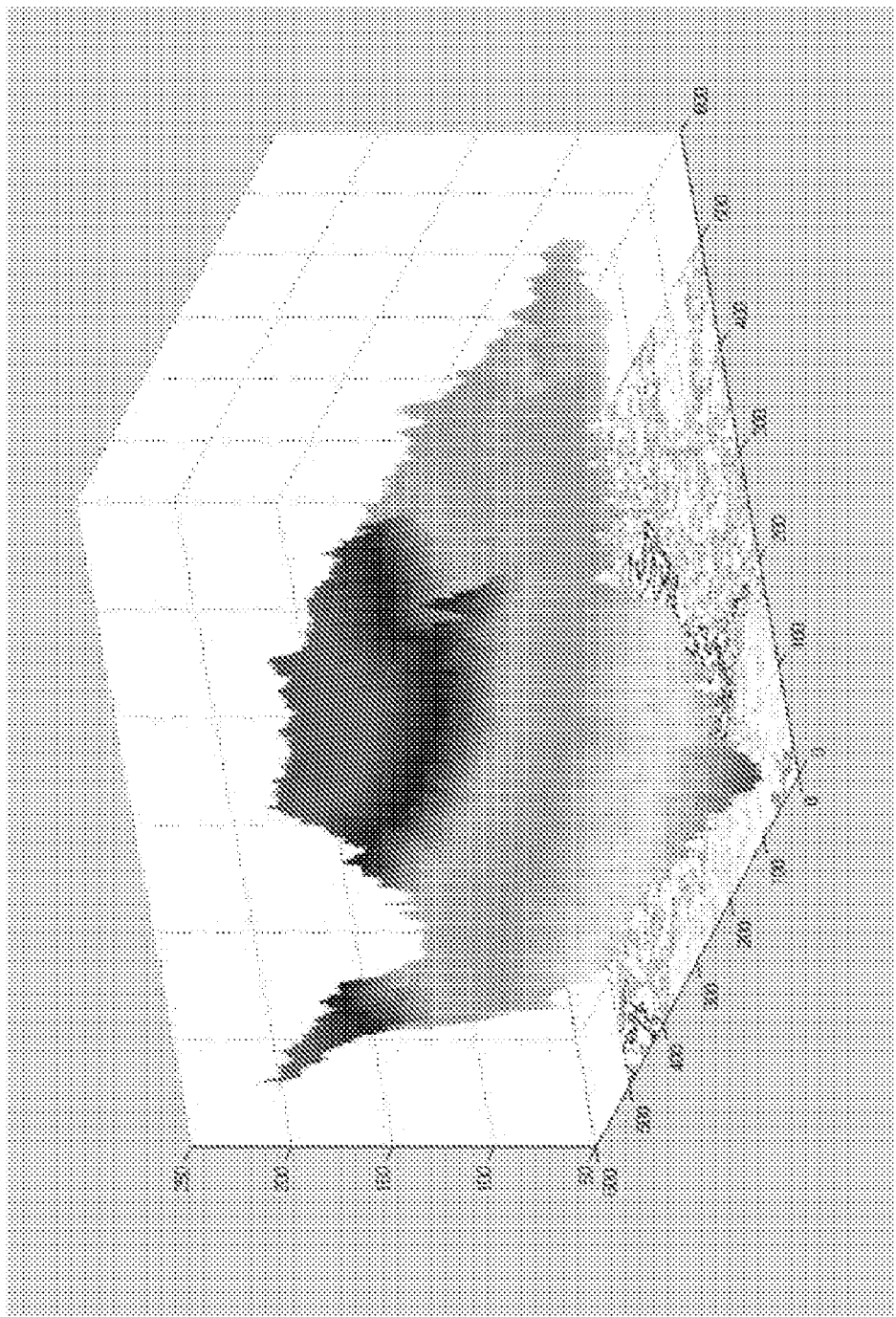
Figure 6:
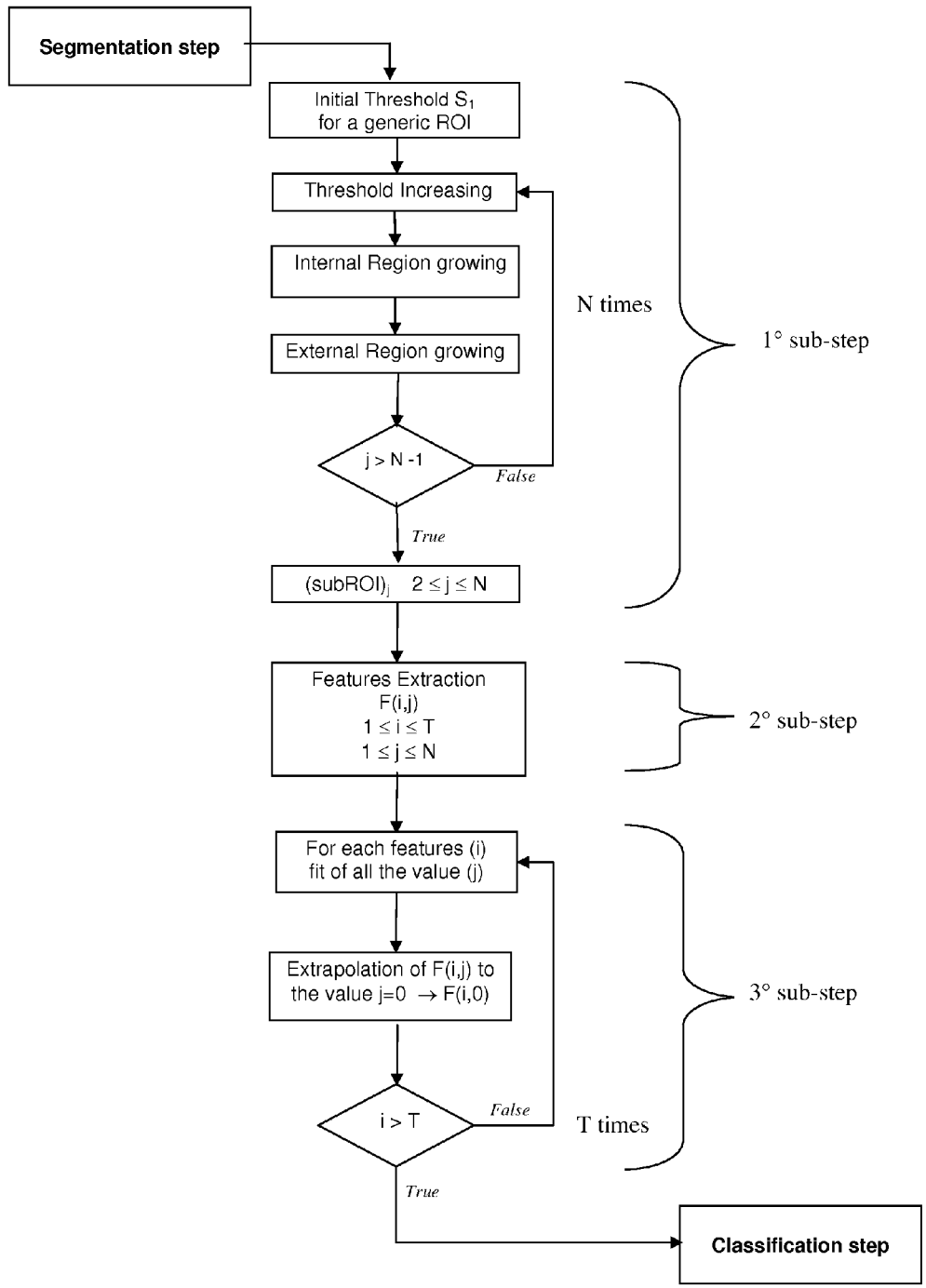
Figure 7B:
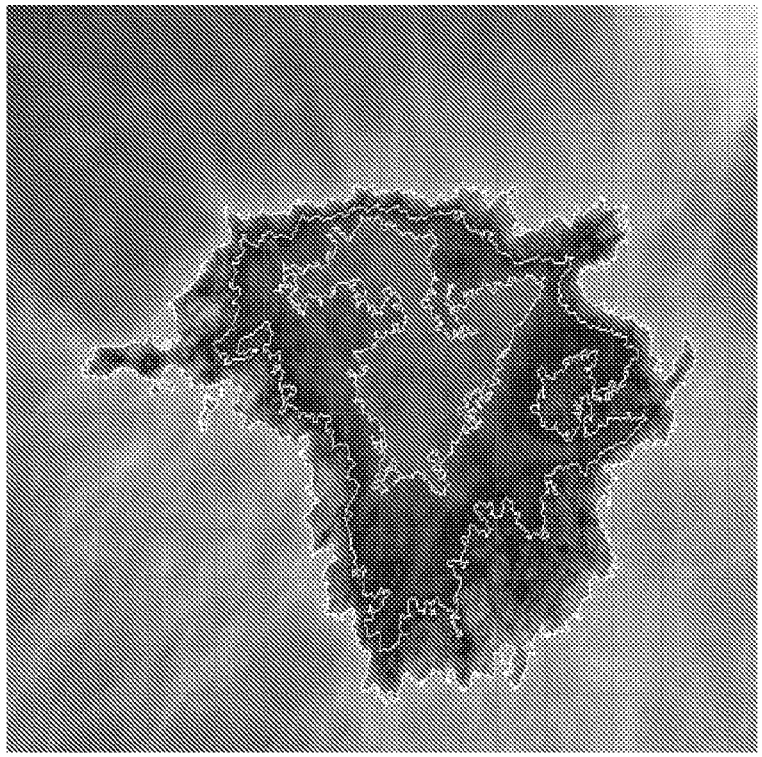
Figure 7A:
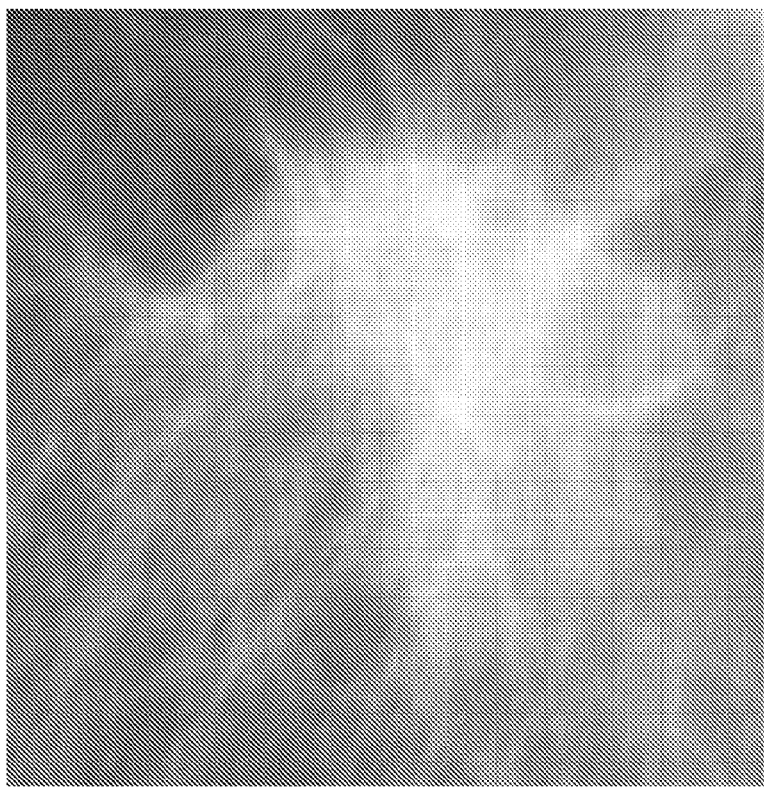

the FIG. 5 shows a three-dimensional representation of the brightness of a mammographic surface with lesion;

FIG. 6 is a flow diagram of a procedure to analyse an image, object of this invention;

FIG. 7A is an example of image with massive lesion;

FIG. 7B is a graphic representation of the subROIs of the image in FIG. 7A; and

FIGS. 8A to 8E are images related to a mammography during the various processing phases, according to this invention.

DETAILED DESCRIPTION OF THE INVENTION

Figure 1A:
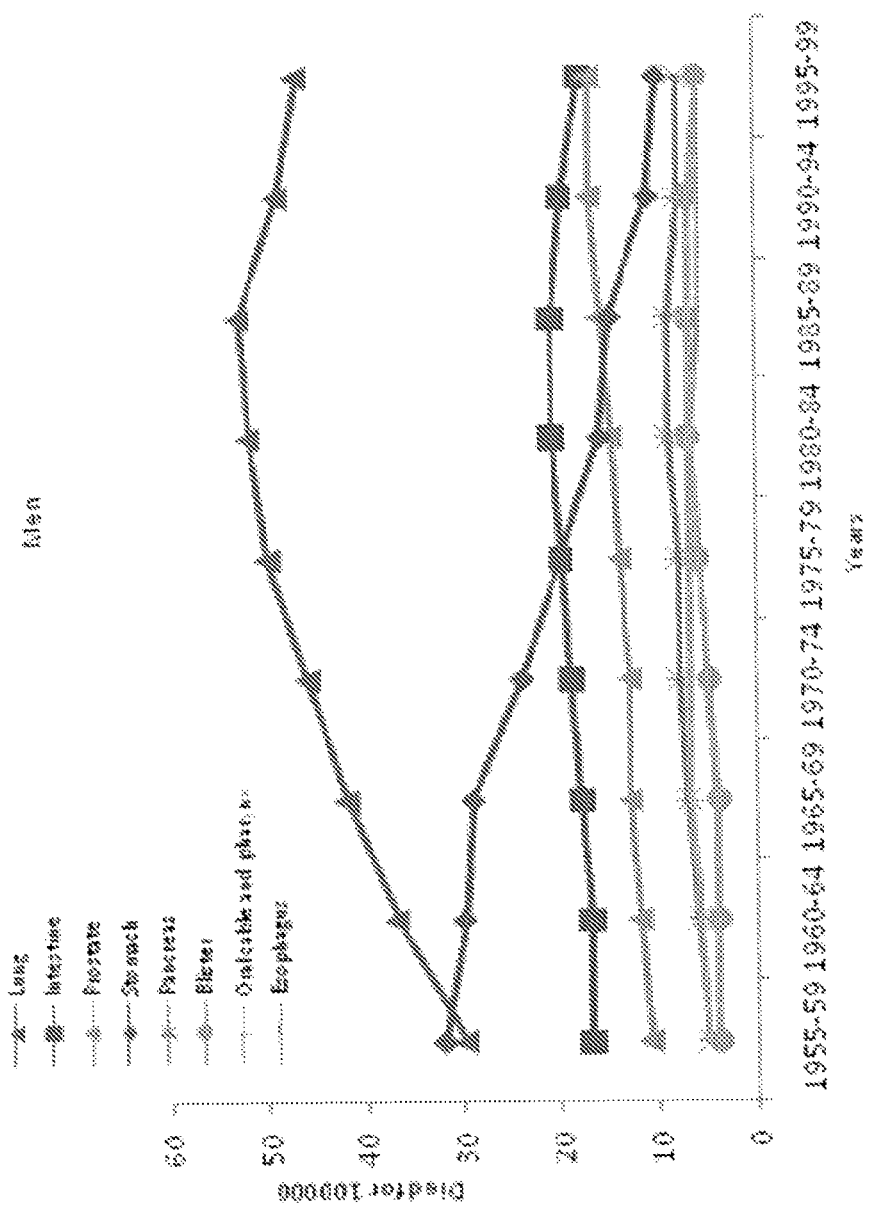
FIGS. 1A and 1B are graphs that report the rates of mortality for the seven principal kinds of tumours for both men and women.
Figure 1B:
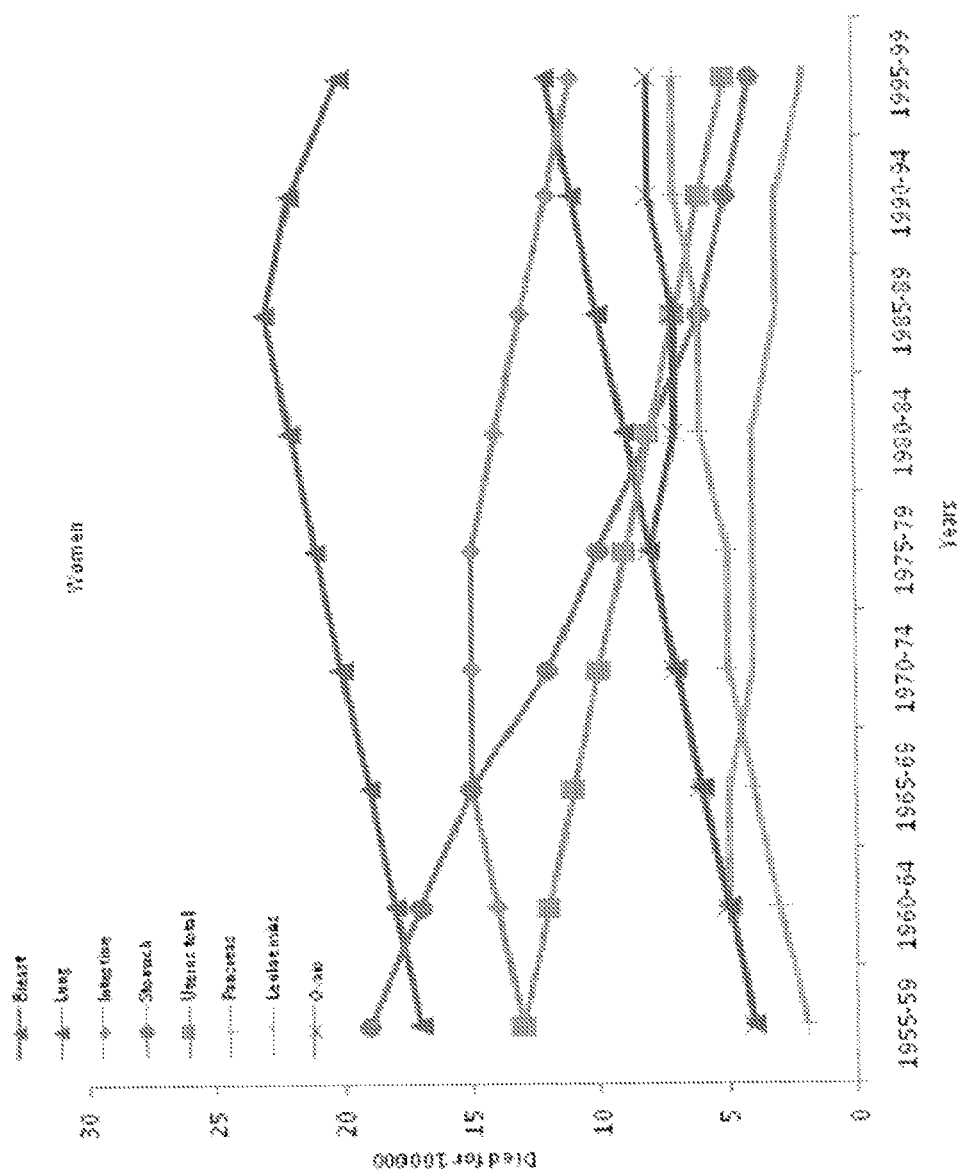
Figure 2:
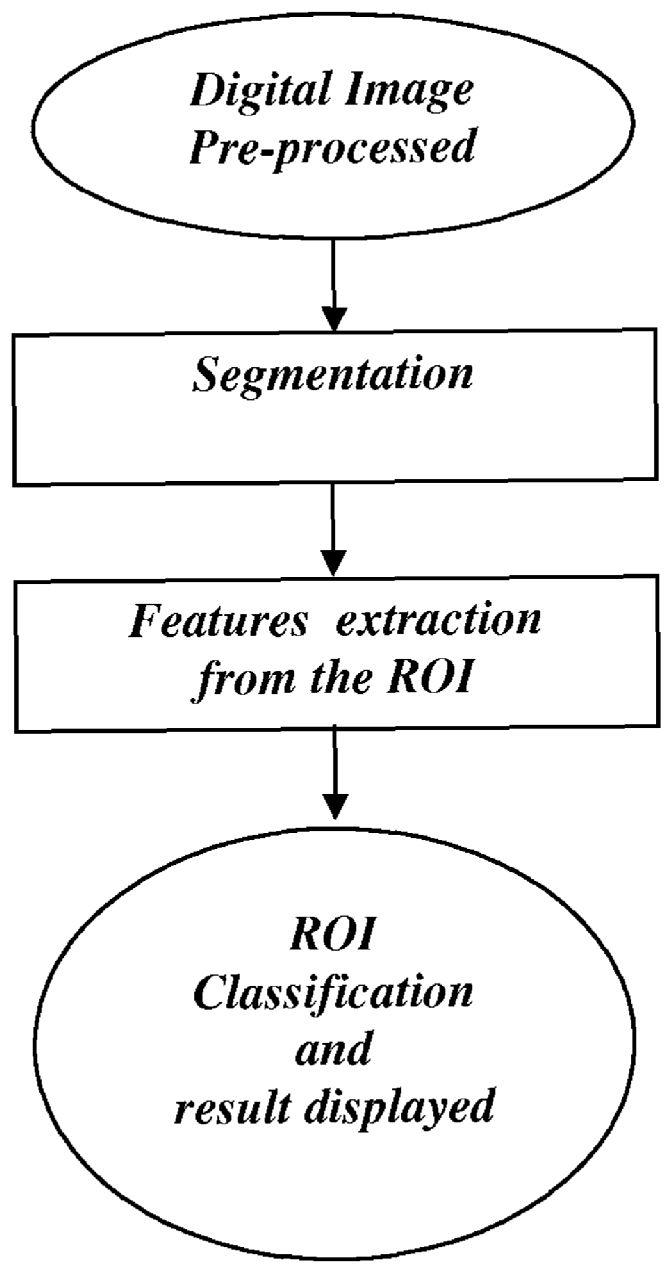
FIG. 2 is a flow diagram that represent the method according to this invention.

Generally speaking, the functioning of a CAD can be divided in different steps that can be schematized as shown in FIG. 2, in which is represented a flow diagram of the method according to the present invention. The steps are the folio wings:

pre-processing: the digital image is processed in order to delimit the mammographic area to be submitted to further analysis;

segmentation: the cleaned image is segmented in order to select regions of interest (ROI) mapping out its contour;

extraction: from each ROI is extracted some characteristic information;

classification: to each ROI is assigned a probability of pathology;

visualization: the full mammographic image is displayed on a screen or on paper, highlighting the ROIs having a pathology probability superior to a threshold value selected by the radiologist.

According to this invention, the extraction step is divided in 3 more sub-steps, as it will be explained in details:

1° sub-step: N subROI$_j$ are extracted for every ROI, related to N threshold level, such that (subROI)$_{j+1}$ ⊂ (subROI)$_j$;

2° sub-step: for each (subROI)$_j$ a set of (morphological, geometrical and physical) features is extracted;

3° sub-step: the "variability" of each feature is analyzed vs. the threshold level (j) founding a best function g(j) that better fit the data. Than a set of further features is extracted by extrapolating the features values to the threshold level j=0.

According to this invention, the extraction step (sub-step 1, 2 and 3) has the purpose to furnish not only a "current" probability of pathology, but also an "evolution" probability of pathology; this extraction step requires a pre-processed and segmented image as input, and it is followed by a classification step in order to differentiate the ROIs.

The method reported in this invention can be conveniently implemented through a software able to be used on any kind of computer architecture (Macintosh, i386, Sun Solaris, etc.) and under any operating system (Linux, Windows, MAC OS, OS/2, etc.). In the following we will give a detailed description of all the steps that constitute the invention.

Pre-Processing Step

Starting from a biomedical image, acquired directly through well known systems in digital form or digitized, the contour of the mammary surface is mapped in the original digital image, ready for the following analysis, deleting all the extraneous objects. Thus are deleted all the parts of the images allowing to identify the patient, the high brightness edges which constitute a source of troubles for the automatic analysis process, because of their disturbance potential for the image processing algorithms. The pre-processed images can be obtained with any algorithm among those normally used in literature which reduces the area of investigation to a selected region of interest.

Segmentation Step

Within this step the segmentation is performed in the regions of interest (ROI) of the previously pre-processed image.

The following formal definition of the problem is given for the segmentation process: let P be a predicate of homogeneity, defined on a set of connected pixels; the segmentation is the partition of the set I of the pixels of the image in not empty connected subsets (or regions) $\Re_1, \Re_2, \ldots, \Re_m$ such as:

$$\bigcup_{k=1}^{m} \Re_k = I$$

$$\Re_k \cap \Re_l = \emptyset (k \neq l)$$

with:

$P(\Re_k)$=true for $1<k<m$;

$P(\Re_k \cup \Re_l)$=false($k \neq l$) and $\Re_k, \Re_l$ bordering regions.

A good segmentation method has to satisfy the following criteria:
1. the regions have to be homogeneous as much as possible;
2. the boundary of the regions have to be compatible with the variations of the chosen similarity measure;
3. areas perceived as uniform should not be separated in more parts.

The methods used for the monochrome images segmentation can be based on:
discontinuity measures separating the image through the detection of lines and contours;
grey levels homogeneity (histogram thresholding, clustering, region splitting, merging and region growing).

The "region growing" method consists in determining a set of points or initial regions (seeds) which are expanded by incorporation of the neighbouring pixels having met a test of similarity with the region.

According to this invention a variation of the standard region growing is implemented. In the hypothesis that the lesions to identify are radio-opaque (particularly bright) regions inside the mammographic image, it is preferable to choose as seeds the local intensity maxima in a neighborhood determined by the minimum size of a massive lesion.

Figure 3A:
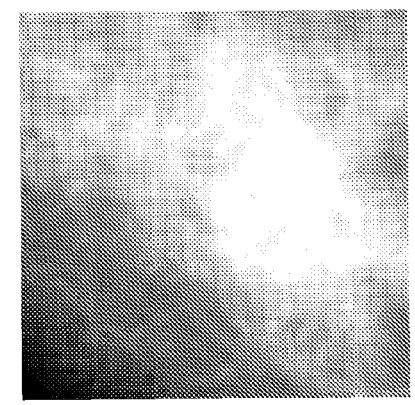
FIGS. 3A to 3D show a part of an image in the various phases of the segmentation process.

At this point, if we choose a seed, a window is delimited around it (FIG. 3A) whose size is determined considering the maximum size of a massive lesion; on this scanning window one applies a threshold(ing) operator. This operator, as well as all single pixel operator, is characterized by a transfer function F such as the value of the intensity for each pixel of the new image depends only on the pixel intensity value corresponding to the original image. In this case one has:

$$I'_{x,y} = F(I_{x,y})$$

where $I_{x,y}$ is the intensity of the pixel with the coordinates (x,y).

Figure 3B:
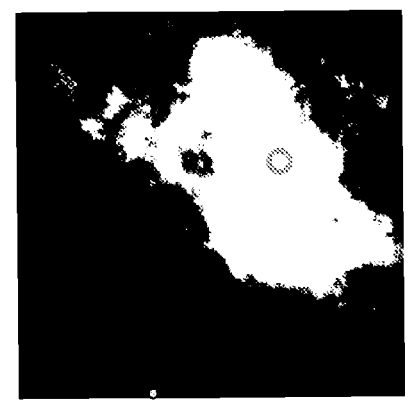

In its most general form this operator assigns different values to pixels with intensity higher or lower than a particular threshold value S (FIG. 3B).

$$\text{if } I_{x,y} \geq S \Rightarrow I'_{x,y} = I^+$$

$$\text{if } I_{x,y} < S \Rightarrow I'_{x,y} = I^-$$

where $I^+$ e $I^-$ are two values fixed in advance. This operator can be used to identify objects inside an image, if we force $I^- = 0$. Within this method, the final image will include only the objects of intensities above the threshold.

In the FIG. 3B is shown the image of the window, after the application of the thresholding operator; the small circle points out the local maximum of intensity.

Figure 3C:
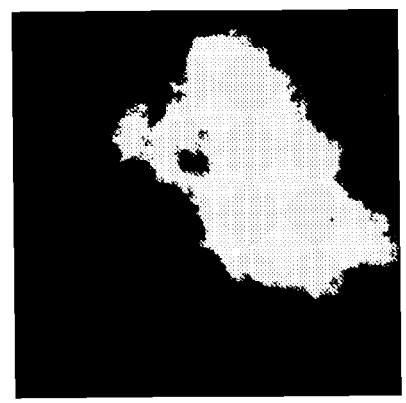

If one uses this image as starting point and applies to it a standard region growing process, the result would be an image as shown in the FIG. 3C. It is easy to deduce that in this case the holes are not considered parts of the region.

In order to eliminate this drawback, in this invention a double region growing is operated: a first external region growing which outlines the contour of the region and a second internal region growing which includes the holes; in the external region growing the initial seeds are the pixels on the edge of the scanning window with intensities below the threshold ($I_{x,y} < S$).

Figure 3D:
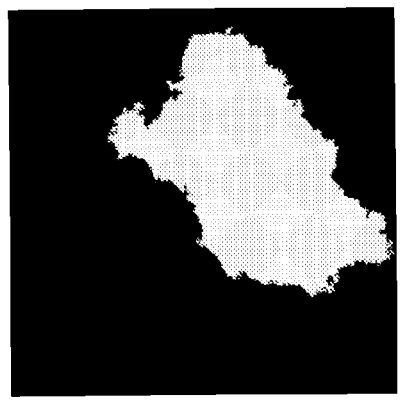

For both region growings, the growth of the region has been made by considering the "neighbouring" pixels according to the 4-connection metrics, where the condition of homogeneity is satisfied by those pixels that, after thresholding, have the intensity value equal to $I^+$ for the internal region growing and equal to $I^-$ for the external region growing. The result is shown in FIG. 3D.

Starting from an initial seed it is possible to obtain a set of iso-contours as function of the threshold S. Therefore, the detection of a region of interest through region growing is correlated to the choice of an appropriate threshold.

In this invention the choice of the optimal threshold value S is dynamic. In fact the procedure is repeated by increasing or decreasing the threshold value in a dichotomous manner, in order to obtain the maximum surface region which is entirely contained inside the scanning window.

At each step the scanning window is centred on the brightness centre of the region, in such a mode that, at the end of the process, the region is perfectly centred and identified by a set of points (contour) whose intensity is greater or equal to the threshold S.

Figure 4:
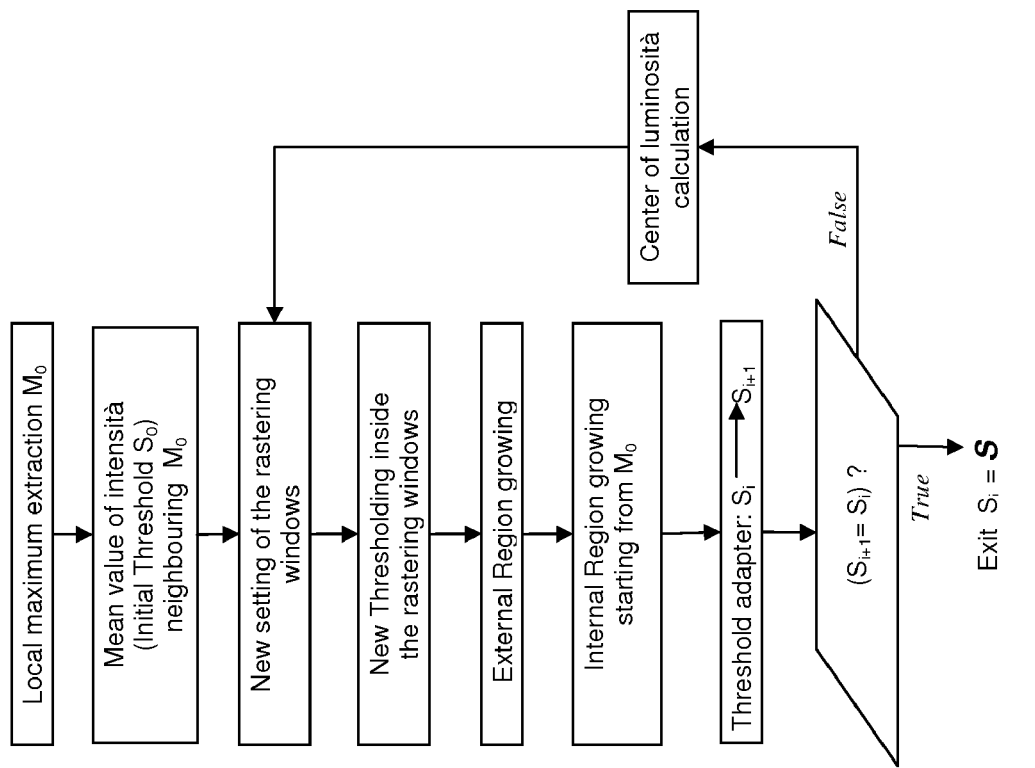
FIG. 4 shows the flow diagram of the segmentation algorithm according to this invention.

The algorithm developed according to this invention is described in the flow diagram represented in FIG. 4.

Among the regions selected during the above described process, those with an average diameter out of the massive lesions typical range (3-40 mm) are discarded. Moreover, because the excessive stretching of a ROI is considered a pathology absence indication, the regions with low value of eccentricity are excluded. The regions selected at the end of the current phase are considered of interest for the further described analysis step.

The output of the segmentation step is a reduced image in which only ROIs are present.

Extraction Step

In FIG. 5 is shown a three-dimensional representation of the brightness of a mammographic surface with massive lesion. The purpose of this step in the invention is to carry out a features variability study for a single ROI vs. the intensity threshold value and to extrapolate the value of a generic feature, forecasting its future evolution.

As already told, the extraction step includes 3 more sub-steps.

In FIG. 6 it is drawn the flow diagram related to this phase.
1° Sub-Step

As already stressed, the segmentation methods depend at least on a parameter (for example the grey levels intensity) that defines the particular area delimitation.

The threshold value of the parameter S that defines the extension of the ROIs in the segmentation step, according to this invention, is the starting value for this first sub-step.

According to this invention, the parameter S is progressively increased N−1 times with an appropriate step, extracting for every value $S_j$ a correspondent subROI$_j$ with $2 \leq j \leq N$ (the subROI with j=1 corresponds to the initial ROI). The subROIs are obtained by double region growing, just like in the segmentation step. At the end of this process we will have N−1 subROIs (with subROI$_{j+1}$ ⊂ subROI$_j$) and the first ROI that contains all the others.

As an example, in FIG. 7A it is visible a portion of the mammographic image with a massive lesion, while in FIG. 7B it is visible the same lesion emphasizing the contours of the most external ROI and two more subROIs detected with the procedure described in this step.
2° Sub-Step At the end of the first step some regions of interest (ROI and subROI) are been selected without supplying further information. It is common procedure within this kind of CAD programs to insert a step of extraction of appropriate features from the ROIs, such that any decisional algorithm can correctly separate possible pathological regions from healthy. In this invention, as an example, a set of discriminating features has been pulled out from the segmented mammographic images. Generally, the features selection criteria are based on morphological differentiation of the lesions.

The features extraction plays a fundamental role for the pattern recognition systems. According to this invention the features are calculated for the native ROI and for all the subROIs, that is for every value $S_j$ of the parameter with $1 \leq j \leq N$, getting a matrix $F(i,j)$, where i labels the i-th feature while j labels the j-th value of the parameter.

3° Sub-Step

In this step, a fit is performed on the N obtained values, for each feature in correspondence to the values $S_j$ of the parameter. The formula used to fit the values depends on the particular feature to extrapolate, on the exposure of the mammographic image to analyze and on the parameter used to identify all the subROIs; moreover a different behaviour characterizes the healthy or sick ROIs. In this invention it was decided to consider more functions of fit (linear, polynomial, exponential, logarithmic, . . . ) and to choose among these, for each single feature and for each considered ROI, the function with minimum mean-squares error.

For each new ROI and for each feature, the selected function allows to extrapolate the value of the feature to the level 0 of the parameter. Thus, out of the usual T features $F(i,1)$ calculated with the value S1 of the parameter (initial threshold), the extrapolation procedure enables to obtain a number T of features $F(i,0)$ calculated with a value S0 of the parameter.

Thus, from the sequence:

$F(1,1), F(1,2), \ldots F(1,j), \ldots F(1,N)$ we obtain the value: $F(1,0)$

By repeating this operation for all the T features, one gets:

$F(1,0), F(2,0), \ldots F(i,0), \ldots F(T,0)$.

This third sub-step represents one of the crucial and mostly innovative phases of the method according to the present invention. In fact, until now, other CAD have used many features but have calculated only on the ROI associated to a correspondent lesion, while the method according to this invention exploits the "variability" of the features calculated on the ROI and subROIs related to the same lesion.

Such procedure allows an analysis of the tumour "growth", thus pointing out early the presence of tumoral lesions. It was in fact observed that the spatial variability of the features, for several values $S_j$ of the parameter, is correlated to the temporal evolution of the ROIs and therefore to the possible tumour. In such circumstances the behaviour of the pathological ROIs is different from the healthy ROIs because of the speed and the tumour expansion characteristics themselves, such as a greater ramification and penetration over a time period.

Classification Step

Within this step the features calculated in the previous phase are used to classify the ROIs with the purpose to assign to each ROI a pathology probability. More specifically, for the set of values set (A): $F(i,1)$, for $1 \leq i \leq T$ the T features are computed for a level 1 of the parameter to assign a "current" pathology probability, while for the set of values set(B): $F(i,0)$, for $1 \leq i \leq T$ the T features are computed for a level 0 of the parameter, to assign an "evolution" pathology probability.

The ROIs "separation" can be obtained with any of the classification algorithms among those normally used in literature. According to this invention the ROIs are classified 2 times, with respect both to the set(A) and to the set(B) of features.

Visualization Step

Within this step the results of the previous steps expressed in terms of pathology probability are displayed on any kind of support (screen, paper), in order to be brought to the radiologist's attention. For instance, the visualization has been actuated by drawing a circle around the ROI if the pathology probability is above a threshold value chosen by the radiologist. Specifically, the radiologist can choose whether to highlight the ROIs with "current" or "evolution" probability.

As an application example, in FIG. 8 are shown the images related to a mammography after performing the various steps of the method, according to this invention.

Figure 8C:
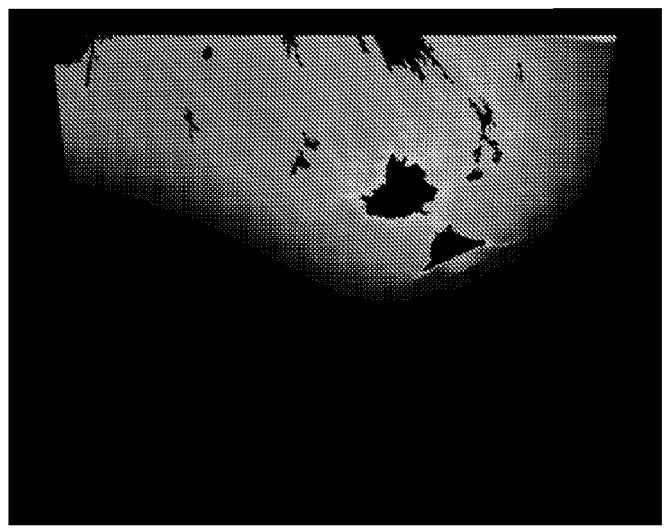
Figure 8B:
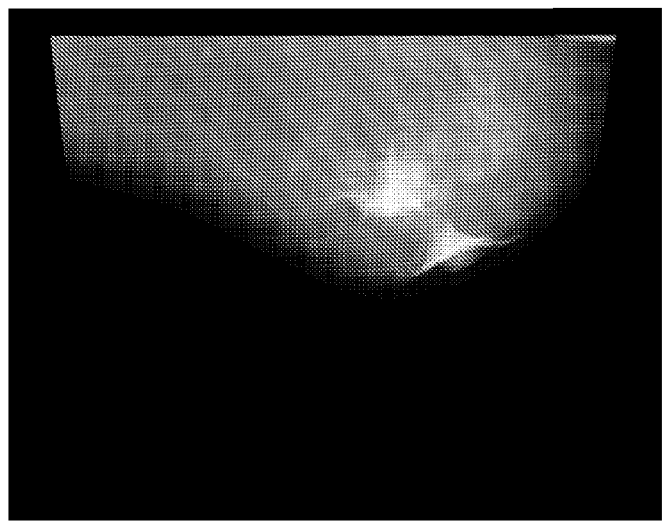
Figure 8A:
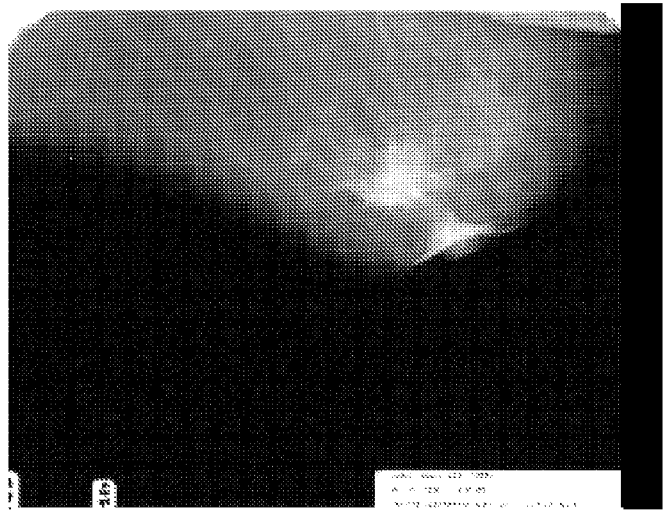
Figure 8E:
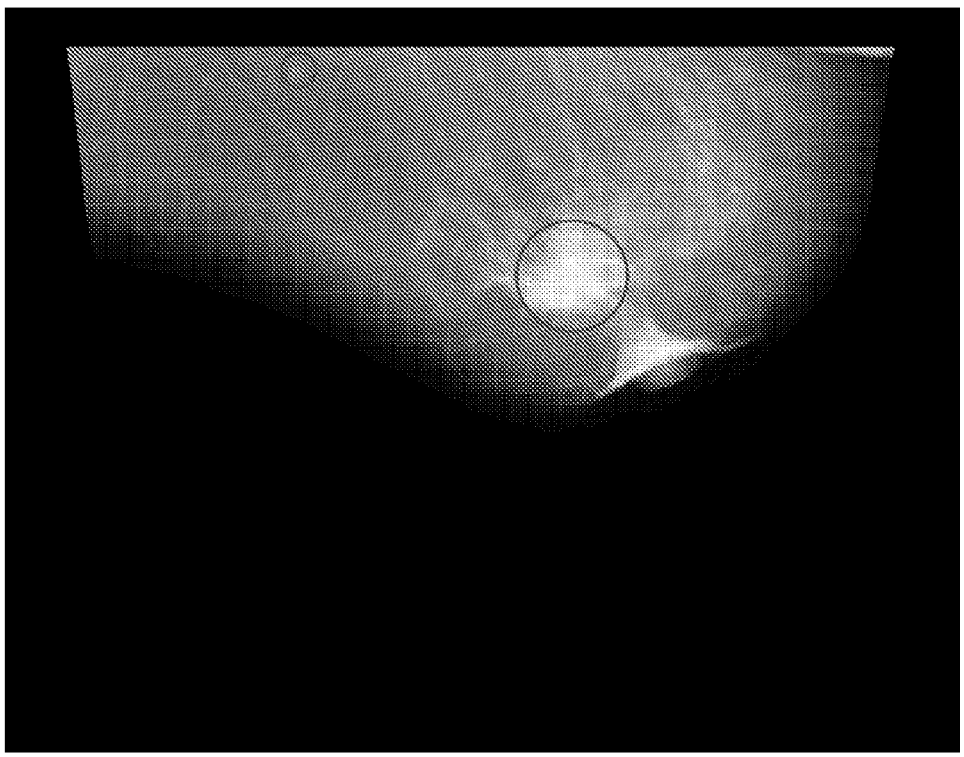
Figure 8D:
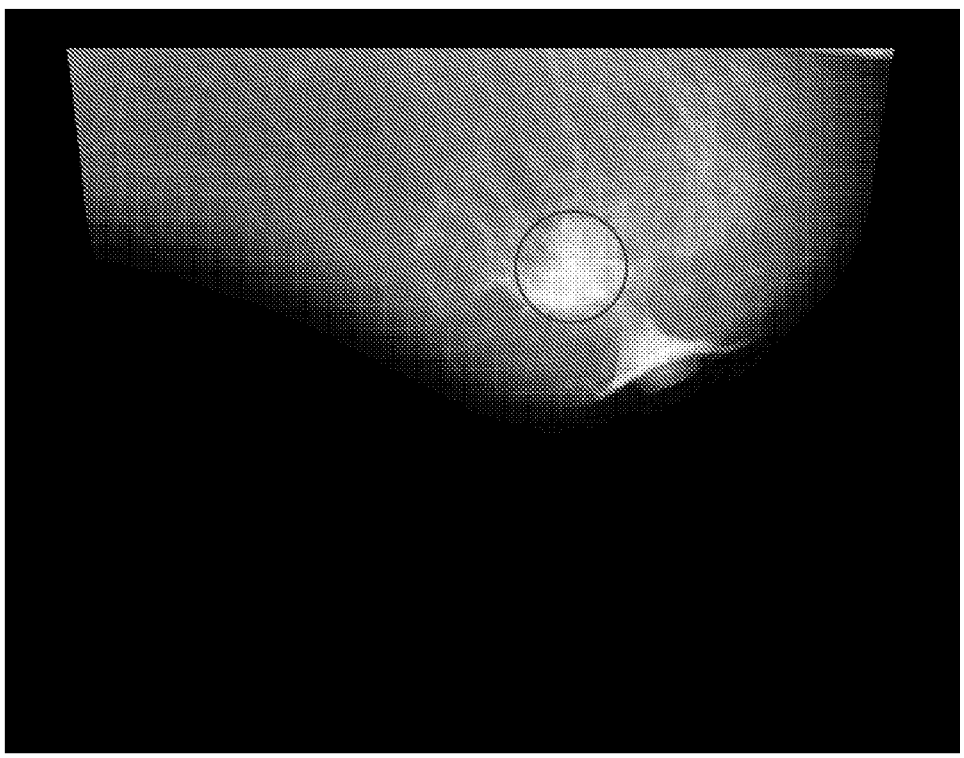

In the FIG. 8A is represented the original mammographic image; the FIG. 8B displays the same image after pre-processing; the FIG. 8C displays the final image after the segmentation step in which the selected ROIs have been artificially blackened; in FIG. 8D is represented the image in which the ROIs with the "current" pathology probability above 80% have been highlighted. Finally, in FIG. 8E one shows the same mammography in which the ROIs with the "evolution" pathology probability above 80% have been highlighted. In the FIG. 8E one can notice a highlighted ROI which doesn't show up in the FIG. 8D.

The originality of the method making the object of this invention, consists especially in the "dynamic" features analysis which is assumed to be correlated with ROI evolution "temporal" analysis. The basic hypothesis of this conjecture is that by singling out the structure of the ROI for various levels of an appropriate parameter which determines the segmentation, the different evolution stages of a pathological ROI can be fully recorded. This hypothesis is supported by the expansion characteristics of some types of tumoral tissue; its evolution can be likened to an expanding solid. This three-dimensional solid will be mapped at the radiographic examination on a bi-dimensional "object" with the intensity values falling towards the borders, because of the correspondent thickness reduction of the tissue from the path of the X rays. The more internal part of the "object", generally "older", will be characterized by a greater brightness on the plate. Under this hypothesis, in a three-dimensional graph in which the coordinates of the image correspond to the x and y axis, and pixel brightness to the z axis (FIG. 5), it is possible to consider that the z axis is time-correlated. Therefore the features' variation with respect to the parameter may define the time behaviour of the same feature. This behaviour was studied by using the linear and nonlinear fit, and by getting further features that may represent the possible extrapolated evolution of the ROI, in order to distinguish better the healthy from the pathological ROIs. We believe that such features allow the CAD to exhibit a higher "predictive" behaviour, by singling out from the image that what even the eye of an experienced radiologist doesn't succeed to extrapolate.

The present invention has hereto been described according to preferred embodiments thereof, given by way of example and not for limitative purposes. It is understood that other embodiments might be envisaged, all to be construed as falling within the protective scope thereof, as defined by the annexed claims.

The invention claimed is:

1. A method for processing biomedical images, comprising:
   acquiring a biomedical digitalized image of a suspicious area belonging to a patient to be examined;
   pre-processing the acquired biomedical digitalized image, to isolate a sub-image;
   selecting one or more regions of interest from the sub-image;
   tracing contours of the selected one or more regions of interest;
   extracting, from each of the selected one or more regions of interest, one or more features identifying a pathology;

classifying the regions of interest, selected on the basis of the extracted features, by associating, to each region of interest, a value of the pathology existence probability, to early detect the pathology in the patient, wherein the selecting the one or more regions of interest comprises selecting, for each region of interest, a first set of initial seeds inside the region of interest comprising;

verifying neighbouring points neighbouring the first set of initial seeds, to calculate a similarity value of the neighbouring points with the region of interest, and adding the neighbouring points to the first set of initial seeds if the similarity value of the neighbouring points is greater than a threshold value, wherein the extracting the one or more features identifying the pathology comprises, for each region of interest, a first iterative phase during which the threshold value is increased, thus drawing for each increased threshold value a corresponding sub-region of interest strictly included inside a previously considered region, and wherein the extracting the one or more features identifying the pathology comprises a second phase of interpolating values of all features of the features matrix for each sub-region of interest, thus obtaining an extrapolated feature value corresponding to an extrapolated threshold value.

2. The method according to claim 1, further comprising visualizing the acquired biomedical digitalized image, the visualizing comprising highlighting the regions of interest for which the associated value of pathology existence probability is greater than a threshold value.

3. The method according to claim 1, wherein the pre-processing the acquired biomedical digitalized image comprises contour definition of the sub-image.

4. The method according to claim 1, wherein, portions external to the contour of the sub-image are removed.

5. The method according to claim 1, wherein the first set of initial seeds comprises points of the biomedical digitalized image exhibiting a maximum of brightness.

6. The method according to claim 1, wherein the neighbouring points are chosen among points external to the first set of initial seeds.

7. The method according to claim 1, wherein the neighbouring points are chosen among points internal to the first set of initial seeds.

8. The method according to claim 1, wherein the neighbouring points are chosen among points that are external or internal to the first set of the initial seeds.

9. The method according to claim 1, wherein the extracting the one or more features identifying the pathology comprises a third phase for determining the one or more features for each sub-region of interest, wherein a features matrix is obtained.

10. The method according to claim 1, wherein the interpolating comprises execution of one or more interpolation operations using different functions, to identify a function minimizing a mean-square error.

11. The method according to claim 1, wherein the classifying the regions of interest comprises defining a first set of features comprising features calculated for an initial threshold value and a second set of features comprising features calculated for the extrapolated threshold value.

12. The method according to claim 11, wherein the classifying the regions of interest is performed on the basis of the first set of features.

13. The method according to claim 11, wherein the classifying the regions of interest is performed on the basis of the second set of features.

14. The method according to claim 11, wherein the classifying the regions of interest is performed on the basis of both the first set of features and the second set of features.

* * * * *